Oct. 20, 1925.
R. CRAIG
SCALE
Filed June 13, 1921
1,558,146
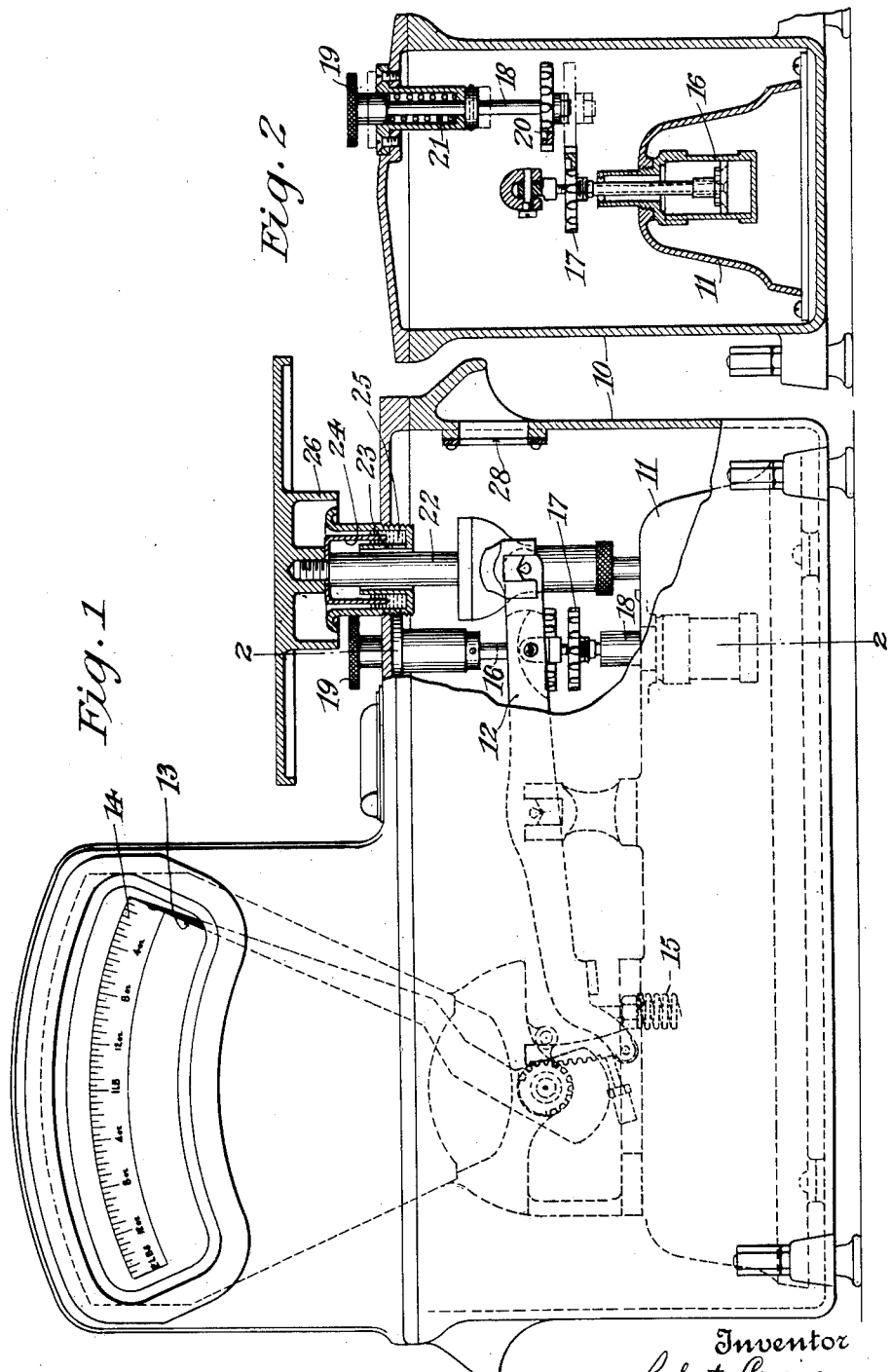
Inventor
Robert Craig
By his Attorneys
Kerr, Page, Cooper & Hayward.

Patented Oct. 20, 1925.

1,558,146

UNITED STATES PATENT OFFICE.

ROBERT CRAIG, OF DAYTON, OHIO, ASSIGNOR, BY MESNE ASSIGNMENTS, TO DAYTON SCALE COMPANY, OF DAYTON, OHIO, A CORPORATION OF NEW JERSEY.

SCALE.

Application filed June 13, 1921. Serial No. 476,995.

*To all whom it may concern:*

Be it known that I, ROBERT CRAIG, being a citizen of the United States of America, residing at Dayton, in the county of Montgomery and State of Ohio, have invented certain new and useful Improvements in Scales, of which the following is a full, clear, and exact description.

This invention relates to improvements in scales and is directed more particularly to improvements in housed scales such as shown in the copending application of Joseph Hopkinson, Serial No. 358,761, filed February 14, 1920.

In the application above referred to an automatic weighing scale was shown enclosed in a tank or housing of such type that the delicate working parts were completely protected from damage due to moisture or other foreign substances.

Scales of the automatic type require a dash-pot device to control their action. In the construction heretofore used this dashpot was within the tank or housing and in order to adjust its action it was necessary to remove the cover, reach into the oil, and turn the thumb-screw.

One object of the present invention resides in the provision of means for adjusting the dash-pot from outside the case.

Another object of the invention resides in the provision of an oil seal around the platform stem which is adapted to prevent air, moisture or other substances from passing from the outside to the interior of the housing.

Other objects of the invention will be set forth in detail in the accompanying specification and claims and shown in the drawings which show by way of exemplification one embodiment of the invention.

In the drawings:

Figure 1 shows a side elevation of the scale with certain parts in section to show the interior construction.

Fig. 2 is a detail sectional view taken on line 2—2 of Fig. 1.

In its general details the scale is the same as the construction described in the application above referred to. It comprises an enclosing tank or housing 10 within which is placed a scale having a base 11, and the usual operating parts comprising, a fulcrumed lever 12, and an indicator 13 sweeping over a chart 14. The lever is provided with an automatic counterbalance which may be in the form of a spring 15.

The usual dash-pot 16 is provided which has its piston connected to the scale lever. Dash-pot action is controlled by a valve device having a hollow stem surrounding the piston rod and carrying at its upper end a gear 17. Rotation of this gear to variable extents changes the action of the dash-pot by changing the relation of ports in the valve plate and dash pot plunger. Such dash pots are well known in the art and require no detailed description.

To effect a rotation of the gear 17 and the consequent adjustment of the action of the dash-pot from without the case, I provide a stud 18 carrying a knurled setting knob 19 at its upper end and carrying a gear 20 which is adapted to be enmeshed with the gear 17 when the setting device is displaced to the dotted line position. To facilitate the enmeshment of the gears I preferably bevel the teeth as shown but plain teeth may be used, in which case the gears will slide over each other until they enmesh. Enmeshment will be readily effected in either case since the spring 15 elevates gear 17 yieldingly against its cooperating gear. After the knob 19 has been turned sufficiently to properly adjust the dash-pot the gears are disengaged. Preferably, I provide a spring 21 for this purpose, but other means may be used for maintaining the gears out of engagement except when adjustments are being made. It will be understood that during the weighing operation, the gear parts must be kept out of contact; otherwise, friction would result, which would interfere with the accuracy of the weighing.

In the application heretofore referred to, it is explained that the tank 10 may contain oil or may be empty. Provision was made to prevent liquids entering the case around the platform holder stem 22 by means of concentric guards. In the present embodiment the concentric guards 23—24 are reversely and telescopically arranged as shown in Fig. 1 and the guard 23 is adapted to contain oil 25 or other liquid which with guard 24, forms a seal which effectually prevents the entrance of either air or liquid into the housing. To minimize the chance of foreign substances entering the oil, I preferably extend the edges of the guard 23 upwardly and then downwardly within the depending flanged portion 26 of the platform.

The oil seal construction may be used with either oil immersed scales or with empty tank types of scales. It affords numerous advantages with either type. For example, it protects the scale parts which are above the oil level from corrosion. Its use permits the empty tank type to be used with the same or more protection to the parts that an oil immersed type would have. Empty tank types are advantageous in that they permit the sealing of the scale in air, the elimination of oil with its attendant expense and possibility of leakage, and the possibility of using a lighter platform.

When the tank is used empty, I find it desirable to provide a rubber or like diaphragm 28, which yields and prevents the compression of air within the case from affecting the weighing. The slight variation in balance due to the varying displacement of the parts in the oil of the seal can be compensated for by the usual sealing methods. To cut down this displacement effect the submersible parts should be made as thin as possible.

What I claim is:

1. A weighing scale having movable parts and a housing completely enclosing the movable working parts of the scale and preventing the access of foreign substances thereto, a dash pot connected to a moving part of the scale, and means for adjusting devices which control the action of the dash pot from without the housing.

2. A weighing scale comprising load-counterbalancing indicating and lever parts, an enclosing housing therefor, a dash-pot connected to the scale lever and within the housing, and means for adjusting devices which control the action of the dash pot from without the housing.

3. In a scale having the usual operating parts, a protecting housing surrounding said parts, a weight moved part extending into the housing into cooperation with said operating parts, a dash-pot within the housing and operatively connected to one of said operating parts, and a dash-pot adjusting device operable from without the housing and having provisions for adjusting the same into cooperation with the dash-pot when adjustments are to be made and out of cooperation therewith when weighing is to be carried out.

4. The invention set forth in claim 3 in which a spring is associated with the dash-pot adjusting devices to retract the same automatically from cooperation with the dash pot.

5. The invention set forth in claim 3 in which a gear is provided upon the dash-pot device and in which a second gear is provided upon the adjusting device, said gears being adapted to be enmeshed when the dash-pot is to be adjusted.

In testimony whereof I hereto affix my signature.

ROBERT CRAIG.